United States Patent [19]

Kleinke

[11] Patent Number: 5,498,458
[45] Date of Patent: Mar. 12, 1996

[54] SPIRAL CORES FOR STRESS SKIN STRUCTURES AND THE LIKE AND THE METHOD OF MAKING THE SAME

[75] Inventor: Kenneth E. Kleinke, Toledo, Ohio

[73] Assignee: Schuller International, Inc., Denver, Colo.

[21] Appl. No.: 178,197

[22] Filed: Jan. 6, 1994

[51] Int. Cl.$^6$ ............................ B32B 1/00
[52] U.S. Cl. .................... 428/68; 428/70; 428/71; 428/74; 428/76; 428/317.3; 428/318.8; 428/473.5; 428/906; 52/783.18; 52/783.19; 52/794.1
[58] Field of Search .................... 428/68, 70, 71, 428/74, 76, 37, 317.3, 318.8, 906, 473.5; 52/801, 809, 800

[56] References Cited

U.S. PATENT DOCUMENTS

| 3,193,426 | 7/1965 | Schafer | 428/906 |
| 3,731,792 | 5/1973 | Rolston | 428/906 |
| 3,898,763 | 2/1990 | Ferro | 428/159 |
| 3,900,648 | 8/1975 | Smith | 428/71 |

*Primary Examiner*—Nasser Ahmad
*Attorney, Agent, or Firm*—Cornelius P. Quinn

[57] ABSTRACT

A spiral core comprises successive convolutions of a rigidifying layer which are spaced with respect to each other and maintained in a spiral spaced relationship. Preferably, a spiral insulation layer, having convolutions intermediate the convolutions of the rigidifying layer and forming a laminate with the rigidifying layer, is also present in the spiral core. The insulation layer and the rigidifying layer are bonded together to maintain the laminate spirally wound. The rigidifying layer can be a sheet material that is bonded to the insulation layer or a bonding material that hardens to both form the rigidifying layer and bond the rigidifying layer to the insulation layer. The insulation layer is a flexible insulation material such as, fiber glass blanket, a mineral wool fiber blanket, a ceramic fiber blanket, a polyimide fiber blanket or a foam sheet.

23 Claims, 2 Drawing Sheets

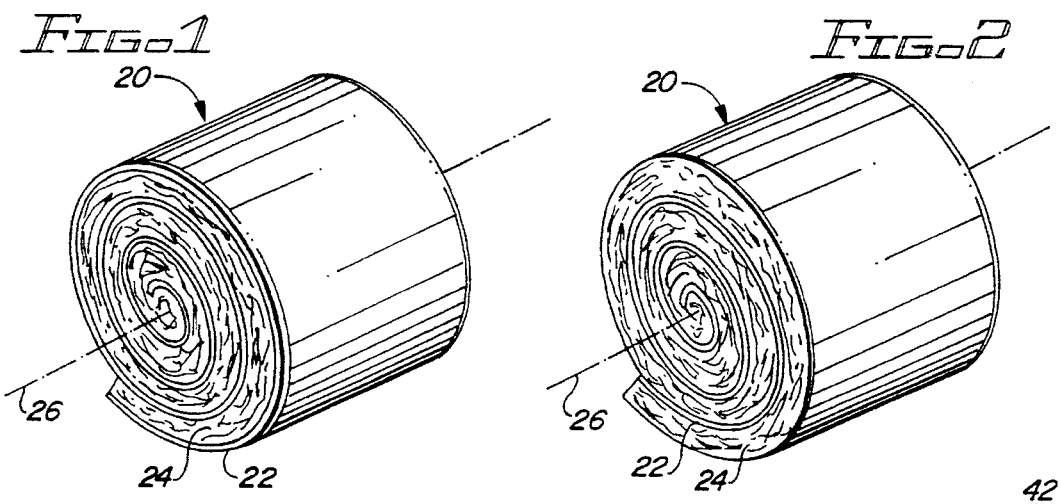
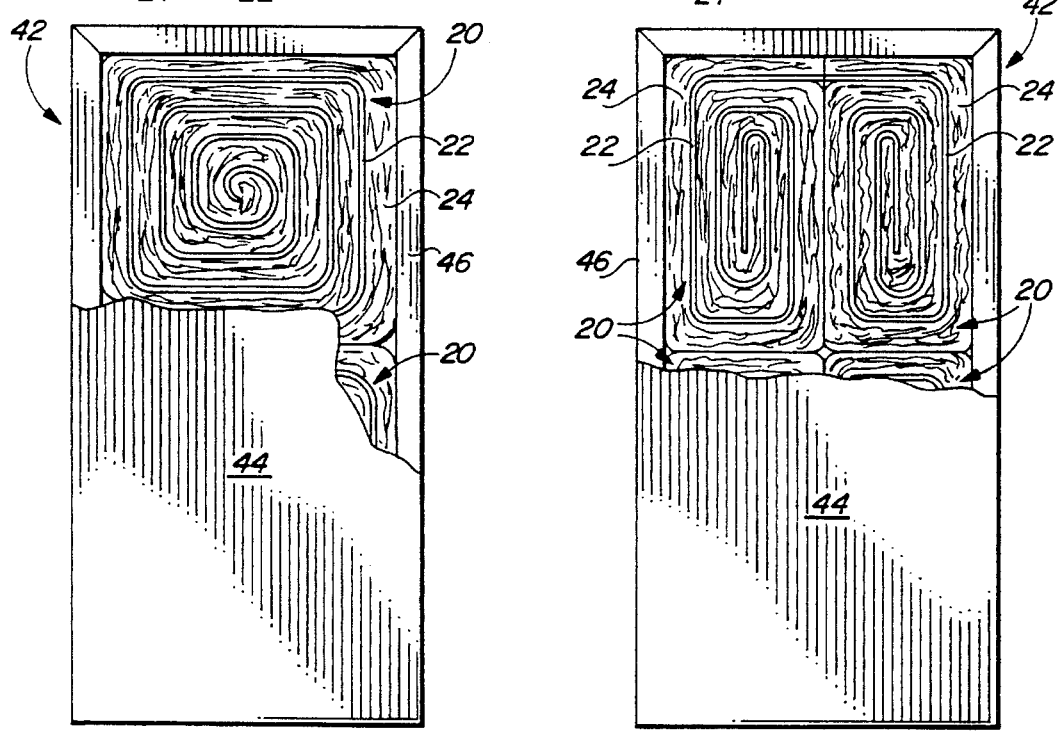
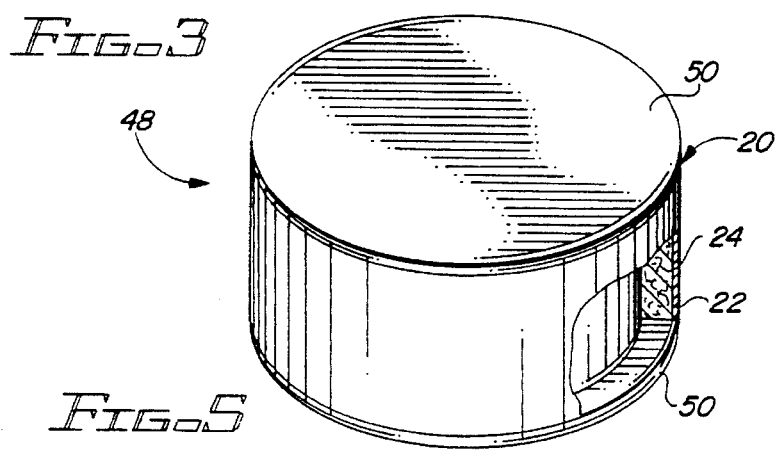

SPIRAL CORES FOR STRESS SKIN STRUCTURES AND THE LIKE AND THE METHOD OF MAKING THE SAME

BACKGROUND OF THE INVENTION

The present invention is directed to spiral cores for reinforcing stress skin and other structures and, in particular, to spiral cores for reinforcing such structures comprising fiber glass insulation and the method of making such cores.

Doors, office partitions, construction panels, wall structures and the like often comprise a peripheral frame with stress skin facing sheets secured to the frame to form a hollow core structure. For certain applications, this type of structure is satisfactory. However, for many applications, the hollow core structure is not strong enough to withstand the service requirements and the structure must be reinforced. One method of reinforcing such structures is to place a cellular or honeycomb reinforcing core within the structure between the stress skin facing sheets. The honeycomb reinforcing core is sandwiched between the stress skin facing sheets providing support to the facing sheets and strengthening the overall structure.

However, these cellular or honeycomb reinforcing cores, which are normally made of wood or metal, do not provide acoustical or thermal insulation to the structure and any insulation for the structure would have to be placed within the structure in a separate operation. In addition, these cellular or honeycomb structures are uniform in structure throughout and provide uniform reinforcement across the width of the stress skin facing sheets. The cellular or honeycomb cores do not provide additional reinforcement away from the peripheral frame where the reinforcement is most needed. Accordingly, there has been a need to provide an improved reinforcing core which both insulates the structure and provides additional reinforcement closer to the middle of the facing sheet and away from the peripheral frame of the structure.

SUMMARY OF THE INVENTION

The present invention satisfies the needs discussed above by providing a spiral core comprising a rigidifying layer and an insulation layer. The rigidifying layer can be formed of a sheet material or of a bonding material and the insulation layer is a fiber glass blanket, a mineral wool fiber blanket, a ceramic fiber blanket, a flexible foam sheet or a like insulation material. The rigidifying layer and the insulation layer are placed together to form a laminate and the laminate is spirally wound to form a core material. The rigidifying layer is more rigid than the insulation layer in a direction parallel to the axis of the spiral core.

When the rigidifying layer is a sheet material, the laminate convolutions are bonded together by applying a bonding material to both sides of the rigidifying layer prior to spirally winding the rigidifying layer and the insulation layer and allowing the bonding material to set as or after the core is formed. When the rigidifying layer is a bonding material, the laminate convolutions of the core are bonded together by applying the rigidifying layer of the bonding material to a surface of the insulation layer prior to spirally winding the rigidifying layer and the insulation layer and allowing the rigidifying layer to set and harden as or after the core is formed. Thus, the bonding material applied to both sides of the rigidifying sheet material or as the rigidifying layer bonds the laminate in the spiral core so that the laminate remains spirally wound as a core upon completion of the winding operation.

The spiral core of the present invention is economical to produce and can be easily produced in large quantities. Insulation is incorporated into the core during the manufacture of the core and the structure being reinforced with one or more spiral cores of the present invention is thereby provided with acoustical and thermal insulation by merely installing the spiral core(s). Due to the flexibility of the rigidifying layer and the flexibility and compressibility of the insulation layer, the spiral cores of the present invention can be deformed in directions perpendicular to the axis of the spiral core to permit the spiral cores to conform in shape to the structure being reinforced.

When the spiral core is being used to reinforce structures, such as, hollow doors or panels, the spiral core provides the most support to the stress skin facing sheets away from the peripheral edges of the facing sheets. This is due to the greater number of convolutions of the rigidifying layer adjacent the axis of the spiral core than adjacent the periphery of the spiral core. Since the stress skin facing sheets are already supported by a peripheral frame adjacent the edges of the facing sheets, the spiral cores of the present invention locate the reinforcement for the stress skin facing sheets where the reinforcement is needed, i.e. away from the edges and at or close to the mid-portions of the stress skin facing sheets.

BRIEF DESCRIPTION OF THE DRAWINGS

FIG. 1 is a perspective view of a spiral core of the present invention with a rigidifying layer on the outside of the laminate convolutions forming the spiral core.

FIG. 2 is a perspective view of a spiral core of the present invention with a rigidifying layer on the inside of the laminate convolutions forming the spiral core.

FIG. 3 is a front elevational view of a door structure, with a portion broken away, to show the placement of two spiral cores within the door structure.

FIG. 4 is a front elevational view of a door structure, with a portion broken away, to show the placement of four spiral cores within the door structure.

FIG. 5 is a perspective view of a cylindrical structure, with a portion broken away, wherein the spiral core also forms the sidewall of the structure.

DETAILED DESCRIPTION OF THE PREFERRED EMBODIMENTS

Figure 6:
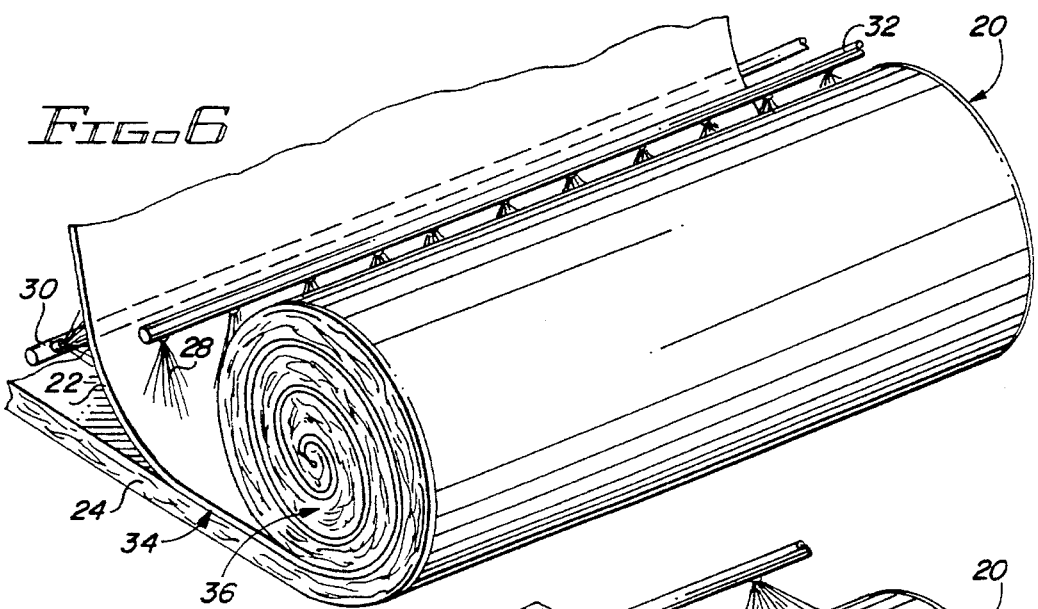
FIG. 6 is a perspective schematic illustrating the laminating and spiral winding of the rigidifying layer and the insulation layer where the rigidifying layer is a sheet material.

As shown in FIGS. 1 and 2, the spiral reinforcing core 20 of the present invention comprises a rigidifying layer 22 and an insulation layer 24. The spiral reinforcing core 20 can be formed with the rigidifying layer 22 on the outside of each convolution of the core and the insulation layer 24 on the inside of each convolution of the core as shown in FIG. 1 or the spiral reinforcing core 20 can be formed with the rigidifying layer 22 on the inside of each convolution of the core and the insulation layer 24 on the outside of each convolution of the core, as shown is FIG. 2.

The rigidifying layer 22 is a sheet material and/or a bonding material. In the finished product, the rigidifying layer 22 is more rigid than the insulation layer 24 in a direction parallel to the axis 26 of the spiral core. However, the rigidifying layer must be flexible enough or pliable enough when the spiral reinforcing core is being formed to be wound into a spiral and during the formation of the spiral reinforcing core, especially when the rigidifying layer is a bonding material, the rigidifying layer may not be as rigid as the insulation layer in the direction parallel to the axis 26 of the spiral core until the bonding material has set or hardened.

As stated above, the rigidifying layer 22 can be formed with a sheet material or a bonding material. Some sheet materials that can be used are: paper, paperboard, chipboard, corrugated media such as corrugated paperboard, fiber glass mat, polymeric fiber mat, plastic sheet, metal sheet and laminates of two or more of such sheet materials. These sheet materials are flexible or deformable and capable of being flexed or bent into the spiral convolutions of the spiral core. In addition, these sheet materials are more rigid than the insulation layer 24 in a direction parallel to the axis 26 of the spiral core 20. In many applications, it is desirable to use a sheet material that retains its flexibly within the spiral core so that the spiral core 20 can be deformed to conform to the shape of the structure being reinforced. In other applications, a sheet material can be used that can be deformed into the convolutions of the spiral core 20 but thereafter retains a set spiral shape under anticipated service conditions. While successive convolutions of the rigidifying layer 22 in the spiral core 24 are normally retained in a spaced relationship with respect to each other, at least in part, by the insulation layer 24, in certain applications, a sheet material 22 could be used that is rigid enough to retain the spaced spiral convolution configuration formed in the winding operation without an insulation layer 24 intermediate successive convolutions.

As stated above, the rigidifying layer 22 can also be formed with a bonding material. Some bonding materials which can be used are: fiber glass chopped strand with a polyester resin and a catalyst, stucco cements, resins, thermosetting polymers and thermoplastic polymers. These materials are applied as a layer on the insulation layer 24 and are wound into spiral convolutions with the insulation layer to form the spiral core 20 while the bonding material is still pliable. After these bonding materials are wound into the spiral core, the convolutions of the bonding material set or harden to form the rigidifying layer 22 which is more rigid than the insulation layer 24 in a direction parallel to the axis of the spiral reinforcing core 20. As with the sheet material, in many applications, it is desirable to use a bonding material which retains its pliability or deformability within the spiral core 20 so that the spiral core can be deformed to conform to the shape of the structure being reinforced. In other applications, a bonding material can be used that hardens or sets rigidly enough to retain a substantially cylindrical, spiral configuration under anticipated service conditions.

The insulation layer 24 is preferably a flexible, compressible insulating material such as a fiber glass insulation blanket, a mineral wool fiber blanket, a ceramic fiber blanket, a polyimide or other synthetic fiber blanket, or a foam insulation. While other flexible, compressible insulation materials can be used, insulation materials such as, a fiber glass blanket, a mineral wool fiber blanket, a ceramic fiber blanket, a polyimide fiber blanket or a polyimide foam is preferred since these insulation materials are not only flexible and compressible, but are also fire proof for all practical purposes, especially when a blanket is used that has little or no binder. Thus, these preferred insulation materials not only function as a thermal and an acoustical insulation, they also function as a fire proofing material to provide safer structures for applications such as doors, office partitions, panels, etc.

FIG. 6, shows the spiral reinforcing core 20 being formed from a sheet material rigidifying layer 22 and an insulation layer 24. As shown, the rigidifying layer 22 has a bonding material 28, such as an adhesive material, a thermosetting material or a thermoplastic material, applied to both sides of the sheet by spray nozzles 30 and 32. The rigidifying sheet 22 is then laid on the insulation layer 24 to form a laminate 34. The laminate 34 is spirally wound in a counterclockwise direction to form a spiral core, such as, the core 20 shown in FIG. 2 which has the rigidifying layer on the inside of the laminate convolutions 36. Since the rigidifying sheet has a bonding material applied to both major surfaces, successive convolutions of the laminate are bonded together so that the spiral core can not unwind.

While the winding process is shown with the rigidifying layer on the inside of the laminate convolutions 36, by winding the laminate 34 in a clockwise direction with the roll being formed below the level of the laminate infeed to the wind-up, the rigidifying layer can be placed on the outside of the laminate convolutions to form a product such as that shown FIG.1. Although the bonding material 28 is being applied in a spraying operation in FIG. 6, the bonding material 28 can be coated onto the rigidifying sheet 22 by a conventional coater or can be applied to the rigidifying sheet by other conventional methods. After the laminate 34 is wound into the spiral core, the spiral core 20 is maintained in the rolled up condition until the bonding material sets or hardens and the laminate convolutions become fixed in the spiral configuration.

By adjusting the tension on the laminate 34 as it is fed into the wind-up with a conventional tensioning roll assembly (not shown), the density of the insulation layer in the spiral core can be controlled. The higher the tension exerted on the laminate 34 as it is fed into the wind-up, the more the insulation is compressed and the greater the density of the insulation layer 24. By placing the laminate under greater tension for the formation of the initial convolutions of the spiral core 20 and lessening the tension on the laminate for the formation of the remaining convolutions of the spiral reinforcing core 20, more convolutions per a given surface area of the core can be formed adjacent the axis 26 of the spiral reinforcing core to provide more reinforcement in this area. Depending on the tensile strength of the insulation, an insulation such as, a fiber glass insulation blanket, can be compressed by a factor of up to about 8.

Figure 7:
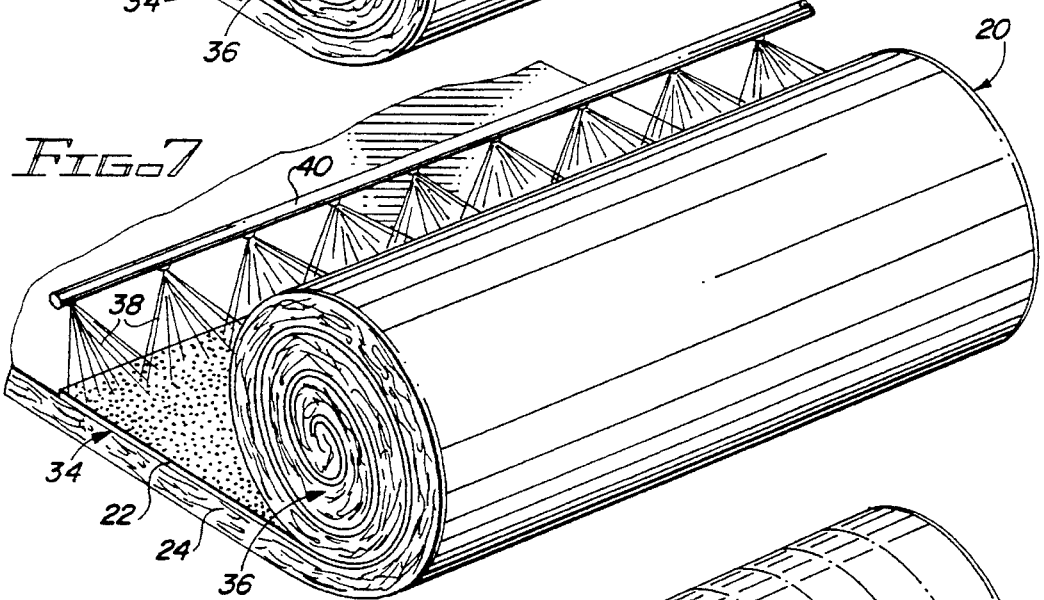
FIG. 7 is a perspective schematic illustrating the laminating and spiral winding of the rigidifying layer and the insulation layer where the rigidifying layer is a bonding material.

FIG. 7 shows the spiral reinforcing core 20 being formed from a bonding material rigidifying layer 22 and an insulation layer 24. As shown, the bonding material 38, such as an adhesive material, a thermosetting material, or a thermoplastic material, is sprayed onto the insulation layer 24 by spray nozzles 40 to form the laminate 34 comprising the sprayed on rigidifying layer 22 and the insulation layer 24. The laminate 34 is spirally wound in a counterclockwise direction to form the spiral core 20 such as the core shown in FIG. 2 which has the rigidifying layer on the inside of the laminate convolutions 36. Since the bonding material layer 22 is interleaved between successive convolutions of the insulation layer 24, the bonding material bonds the laminate convolutions together to fix the convolutions in the spiral configuration. If necessary, the spiral core 20 is maintained in its rolled up condition after the completion of the winding operation until the bonding material sets or hardens.

The winding process shown in FIG. 7 forms the spiral core with the rigidifying layer 22 on the inside of the laminate convolutions 36. However, by winding the laminate 34 in a clockwise direction with the spiral core being formed below the level of the laminate infeed to the wind-up, the rigidifying layer 22 can be placed on the outside of the laminate convolutions to form the spiral core of FIG. 1. Although the bonding material 38 which forms the rigidifying layer 22 is being applied in a spraying operation in FIG. 7, the bonding material can be coated onto the insulation layer 24 by a conventional coater or the bonding material layer can be applied to the insulation layer by other conventional means. As with the winding operation of FIG. 6, the tension on the laminate can be varied to control the density of the insulation layer 24 and to provide a greater concentration of convolutions per a given surface area of the core adjacent the axis of the spiral reinforcing core.

Figure 8:
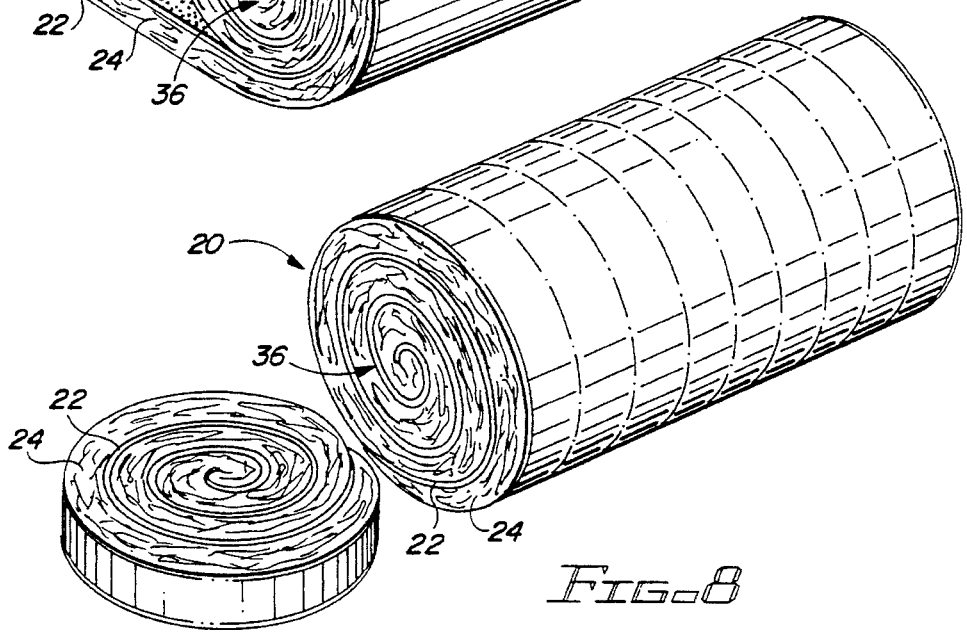
FIG. 8 is a perspective view of a roll of spiral core material being sliced to form a plurality of spiral cores.

FIG. 8 shows a long spiral core 20 formed by the methods illustrated in FIGS. 6 and 7. The spiral core 20 is typically about 40 inches in diameter for use with door structures, but the diameter can be set to fit the particular application. Once the bonding material bonding the laminate convolutions 36 together has set or hardened, the long spiral core 20 can be sliced or cut in a plane perpendicular to the axis of the spiral core to form narrower spiral reinforcing cores for particular applications.

FIGS. 3, 4 and 5 show structures comprising the spiral reinforcing cores 20 of the present invention. FIGS. 3 and 4 are hollow core door, partition or panel structures 42 which have a pair of facing sheets 44 (only one is shown) mounted on opposite sides of a peripheral frame 46. The facing sheets or stress skins 44 are normally thin sheets of wood, steel, plastic, plywood or similar composite or laminated materials. The peripheral frame 46 has substantially the same configuration and dimensions as the facing sheets 44 and is normally formed from wooden or metal beams. Thus, the facing sheets 44 are supported and reinforced along their side edges by the peripheral frame 46 to which they are attached by an adhesive, screws or other conventional fasteners. However, unless the facing sheets 44 are supported in the mid and central portions of the facing sheets, the structures can be damaged by excessive forces being applied to the mid or central portions of the facing sheets during service.

As shown, the structure of FIG. 3 is reinforced by two spiral cores 20 and the structure of FIG. 4 is reinforced by four spiral cores 20. The spiral reinforcing cores 20 have a thickness equal to or substantially equal to the spacing between the facing sheets 44 and are confined within the peripheral frame 46 and the facing sheets 44. Thus, the planar end faces of the spiral reinforcing cores, which extend perpendicular to the axis of the spiral reinforcing cores are maintained in contact with the inner major surfaces of both facing sheets 44 and provide support and reinforcement for the facing sheets. The number of spiral cores used to reinforce a structure can be varied to satisfy the particular reinforcing requirements of the structure. For example, in certain applications, a single spiral core 20 could be used in the structures of either FIGS. 3 or 4.

The spiral cores used to reinforce the facing sheets 44 of structures 42 have flexible or pliable rigidifying layers 22 and the insulation layer 24 is both flexible and compressible. Since the insulation layer 24 is on the outside of the laminate convolutions 36 and the rigidifying layer and insulation layer are both flexible or deformable, the spiral core has been deformed out of its normally cylindrical shape into more of an oval cross section with flattened portions to conform to the configuration of the frame 46. With a compressible and resilient insulation layer 24, such as a fiber glass insulation blanket, a mineral wool fiber blanket, a ceramic fiber blanket, or a polyimide fiber blanket, on the outside of the spiral core, the outer layer of compressible insulation is compressed along the sides of the frame and expands into and fills the voids at the corners of the frame 46 with insulation. Thus, the normally hollow core of the structure 46, including its corner portions, is filled with insulation. The fibrous insulation insulates the structure 46 both acoustically and thermally. In addition, by using a fiberglass blanket, a mineral wool fiber blanket, a ceramic fiber blanket, a polyimide fiber blanket, especially a fiber blanket with little or no binder, or a polyimide foam sheet, the core of the structure is fire proof for all practical purposes.

As shown, the spiral core 20 has a greater concentration of convolutions 36 adjacent the axis of the spiral core than adjacent the periphery of the core. Thus, there is a greater concentration of rigidifying layer convolutions adjacent the center or axis 26 of the spiral core. In a structure such as that of FIGS. 3 and 4, the facing sheets are already supported along their edges by the frame 46 and the greatest need for reinforcement is at the mid or central portions of the facing sheets not adjacent the lateral edges of the facing sheets. The spiral reinforcing core 20, with its greater concentration of rigidifying layer convolutions adjacent its axis 26, provides the added reinforcement in this critical area of the facing sheets 44.

FIG. 5 shows a cylindrical structure 48 comprising a core 20 and a pair of facing sheets 50 which are adhesively bonded or otherwise secured to the ends of the spiral reinforcing core. The spiral core has the rigidifying layer 22 on the outside of the laminate convolutions, as illustrated in FIG. 1, and the rigidifying layer forms the outer surface of the structure. If desired, an additional facing material could be placed over the spiral core 20 for aesthetic or other reasons.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A spiral Support core for supporting a facing sheet of a structure, comprising:

a spiral rigidifying layer having successive convolutions spaced with respect to each other; the spiral rigidifying layer comprising a sheet material;

a spiral insulation layer having convolutions intermediate the convolutions of the rigidifying layer and forming a laminate with the rigidifying layer;

the rigidifying layer being more rigid than the insulation layer in a direction parallel to an axis of the spiral core; and means maintaining the successive convolutions of the spiral rigidifying layer and the spiral insulation layer spirally wound comprising a bonding material bonding the spiral rigidifying layer and the spiral insulation layer together.

2. The spiral core of claim 1, wherein: the bonding material is selected form the group consisting of an adhesive material, a thermoplastic material and a thermosetting material.

3. The spiral core of claim 1, wherein: the rigidifying layer is on an outside of the laminate convolutions of the spiral core.

4. The spiral core of claim 1, wherein: the rigidifying layer is on an inside of the laminate convolutions of the spiral core.

5. The spiral core of claim 1, wherein: the rigidifying layer is a sheet material selected from the group consisting of paper, paperboard, chipboard, corrugated media, fiber glass mat, polymeric fiber mat, plastic sheet, metal sheet, and laminates of at least two of said sheet materials.

6. A spiral support core for supporting a facing sheet of a structure, comprising:

a spiral rigidifying layer having successive convolutions spaced with respect to each other; the rigidifying layer comprising a hardened bonding material;

a spiral insulation layer having convolutions intermediate the convolutions of the rigidifying layer and forming a laminate with the rigidifying layer;

the rigidifying layer being more rigid than the insulation layer in a direction parallel to an axis of the spiral core; and the hardened bonding material of the spiral rigidifying layer being bonded to the spiral insulation layer to maintain the successive convolutions of the spiral rigidifying layer and the spiral insulation layer spirally wound.

7. The spiral core of claim 6, wherein: the bonding material is selected from the group consisting of an adhesive material, a thermoplastic material and a thermosetting material.

8. The spiral core of claim 6, wherein: the rigidifying layer is on an inside of the laminate convolutions of the spiral core.

9. The spiral core of claim 6, wherein: the rigidifying layer is on an outside of the laminate convolutions of the spiral core.

10. A door, partition or panel structure comprising: a facing sheet, said facing sheet having an inner major surface and an outer major surface defined by side edges; a spiral core comprising a spiral rigidifying layer having successive convolutions which are spaced with respect to each other; a spiral insulation layer having convolutions intermediate the convolutions of said rigidifying layer and bonded to the convolutions of said rigidifying layer to form a laminate having convolutions which remain bonded in a spiral configuration; said rigidifying layer being more rigid than said insulation layer in a direction parallel to the axis of said spiral core; and a face of said spiral core, which lies in a plane perpendicular to the axis of said spiral core, in contact with the inner major surface of said facing sheet intermediate said side edges of said facing sheet to reinforce said facing sheet.

11. The structure of claim 10, wherein: a frame means having substantially the same configuration and dimensions as the side edges of the facing sheet is secured to the inside major surface of said facing sheet along said side edges and confines said spiral core.

12. The structure of claim 11, wherein: a second facing sheet having substantially the same configuration and dimensions as the first facing sheet has an inside surface secured to said frame means along side edges of said second facing sheet to enclose said spiral core within said first and second facing sheets and said frame means.

13. The structure of claim 12, wherein: there are at least two spiral cores enclosed within said first and second facing sheets and said frame means.

14. The structure of claim 10, wherein: the rigidifying layer comprises a sheet material.

15. The structure of claim 14, wherein: the rigidifying layer sheet material is selected from the group consisting of paper, paperboard, chipboard, corrugated media, fiber glass mat, polymeric fiber mat, plastic sheet, metal sheet, and laminates of at least two of said sheet materials.

16. The structure of claim 15, wherein: the rigidifying layer is on an outside of the laminate convolutions of the spiral core.

17. The structure of claim 15, wherein: the rigidifying layer is on an inside of the laminate convolutions of the spiral core.

18. The structure of claim 15 wherein: the insulation layer is selected from a group consisting of a fiber glass blanket, a mineral wool fiber blanket, a ceramic fiber blanket, a polyimide fiber blanket and a polyimide foam.

19. The structure of claim 10, wherein: the rigidifying layer comprises a hardened bonding material.

20. The structure of claim 19, wherein: the bonding material is selected from the group consisting of an adhesive material, a thermoplastic material and a thermosetting material.

21. The structure of claim 19, wherein: the insulation layer is selected from a group consisting of a fiber glass blanket, a mineral wool fiber blanket, a ceramic fiber blanket, a polyimide fiber blanket and a polyimide foam.

22. The structure of claim 19, wherein: the rigidifying layer is on the outside of the laminate convolutions of the spiral core.

23. The structure of claim 19, wherein: the rigidifying layer is on the inside of the laminate convolutions of the spiral core.

* * * * *